United States Patent [19]
Shimizu et al.

[11] Patent Number: 5,980,784
[45] Date of Patent: Nov. 9, 1999

[54] METHOD FOR PRODUCING SOLUBLE CONDUCTIVE POLYMER HAVING ACIDIC GROUP

[75] Inventors: Shigeru Shimizu; Masashi Uzawa, both of Yokohama; Takashi Saitoh, Tokyo; Shinichi Maeda, Yokohama, all of Japan

[73] Assignee: Mitsubishi Rayon Co., Ltd., Tokyo, Japan

[21] Appl. No.: 08/941,742

[22] Filed: Oct. 1, 1997

[30] Foreign Application Priority Data

Oct. 2, 1996 [JP] Japan ................................. 8-279872

[51] Int. Cl.$^6$ ........................................... H01B 1/12
[52] U.S. Cl. ........................ 252/500; 528/210; 528/377; 528/403; 528/422
[58] Field of Search .......................... 252/500; 528/210, 528/214, 377, 378, 403, 422

[56] References Cited

U.S. PATENT DOCUMENTS

| | | | |
|---|---|---|---|
| 4,569,734 | 2/1986 | Naarmann et al. | 204/78 |
| 4,937,060 | 6/1990 | Kathirgamanathan et al. | |
| 4,956,441 | 9/1990 | Kathirgamanathan et al. | |
| 5,109,070 | 4/1992 | Epstein et al. | 525/189 |
| 5,115,057 | 5/1992 | Ono et al. | 526/256 |
| 5,354,816 | 10/1994 | Shimizu et al. | |
| 5,560,870 | 10/1996 | Watanabe et al. | 252/500 |
| 5,589,108 | 12/1996 | Shimizu et al. | |

FOREIGN PATENT DOCUMENTS

| | | |
|---|---|---|
| 0 096 319 | 12/1983 | European Pat. Off. |
| 0 540 448 | 5/1993 | European Pat. Off. |
| 0 662 694 A2 | 7/1995 | European Pat. Off. |
| 0 662 694 A3 | 7/1995 | European Pat. Off. |
| 58-210902 | 12/1983 | Japan |
| 60-235831 | 11/1985 | Japan |
| 61-197633 | 9/1986 | Japan |
| 1-301714 | 12/1989 | Japan |
| 2-166165 | 6/1990 | Japan |
| 4-268331 | 9/1992 | Japan |
| 5-178989 | 7/1993 | Japan |
| 5-226238 | 9/1993 | Japan |
| 6-56987 | 3/1994 | Japan |
| 6-293828 | 10/1994 | Japan |
| 07196791 | 8/1995 | Japan |
| 07324132 | 12/1995 | Japan |
| 91/06887 | 5/1991 | WIPO |

OTHER PUBLICATIONS

Kitani et al., "Flexible Polyaniline", Journal of Polymer Science: Part A: Polymer Chemistry, vol. 26, 1988, pp. 1531–1539 (No month).

Vasquez, Journal of the Chemical Society of Japan, 1985, (6), pp. 1124–1130 (No month).

Lecture Preprint in the 64th Autumn Annual Convention of the Chemical Society of Japan, 1922, pp. 706 (No month).

Yue et al., "Effect of Sulfonic Acid Group on Polyaniline Backbone", Journal of American Chemical Society, 1991, 113, pp. 2665–2671 (No month).

Yue et al., "Synthesis of Self–Doped Conducting Polyaniline", Journal of American Chemical Society, 1990, 112, pp. 2800–2801 No month.

Dearmitt et al., "A novel N–substituted polyaniline derivative", Polymer, 1993, vol. 34, No. 1, pp. 158–162 No month.

*Primary Examiner*—Mark Kopec
*Attorney, Agent, or Firm*—Pillsbury Madison & Sutro LLP

[57] ABSTRACT

A method for producing a soluble conductive polymer having acidic groups, which comprises subjecting to electrolytic polymerization (a) at least one compound selected from the group consisting of acidic group-substituted anilines, acidic group-substituted pyrroles, acidic group-substituted thiophenes, acidic group-substituted furans, acidic group-substituted selenophenes, acidic group-substituted tellurophenes, acidic group-substituted isothianaphthenes, acidic group-substituted isobenzofurans, acidic group-substituted isoindolines, acidic group-substituted isobenzoselenophenes, acidic group-substituted isobenzotellurophenes, and their metal salts, ammonium salts and substituted ammonium salts in a solution containing (b) a basic compound.

6 Claims, 1 Drawing Sheet

METHOD FOR PRODUCING SOLUBLE CONDUCTIVE POLYMER HAVING ACIDIC GROUP

BACKGROUND OF THE INVENTION

1. Field of the Invention

This invention relates to a method for producing a soluble conductive polymer which is soluble in a solvent.

A solution comprising this soluble conductive polymer as the main component can be used for forming a conductor by a simple method such as a spray coating method, a dip coating method, a roll coating method, a gravure coating method, a reverse roll coating method, an air-knife coating method, a curtain coating method or the like on various substrates. The above solution can also be used in admixture with a suitable binder polymer for increasing the adhesiveness of a conductive film and the strength of a coating film.

As the substrate to be coated, there are mentioned various plastics, for example, polyester resins such as polyethylene terephthalate (PET), polyethylene-naphthalate (PEN) and the like, polyethylene, polypropylene, polyvinyl chloride, nylon, polystyrene, polycarbonate, epoxy resins, fluoroplastics, polysulfone, polyimide, silicone resins, polyurethane, phenol resins, and the like; molded articles and films of these plastics such as synthetic papers and the like; paper; iron; aluminum; copper; zinc; nickel; stainless steel; and the like. The coating step may be conducted in the course of the production of these substrates, for example, before or during a monoaxial stretching step, a biaxial stretching step, a molding step, an embossing step or the like, or can be applied to a substrate which has been subjected to these treatment.

Moreover, a composition comprising the above soluble conductive polymer as the main component can be applied to various antistatic agents, condensers, batteries, EMI shields, chemical sensors, display devices, nonlinear molding materials, anticorrosive agents, adhesives, fibers, antistatic coating compositions, electro-coating compositions, plating primer, electrostatic coating primer, electric prevention for corrosion, enhancement of the storing capacity of battery and the like. In addition, the above polymer is excellent in applicability to various antistatic uses because it has no moisture-dependency of conductivity, has a high transparency and can be subjected to stretching, molding, embossing and the like.

The application of the soluble conductive polymer to antistatic uses includes packaging materials, magnetic cards, magnetic tapes, magnetic discs, photographic films, printing substrates, heat seal tapes and films, IC trays, IC carrier tapes, cover tapes and the like.

2. Description of the Related Art

Doped polyaniline has been well known as a soluble conductive polymer; however, it is insoluble in almost all general solvents except some nonprotonic polar solvents and hence has a difficulty in molding.

Moreover, though a process for producing a polyaniline by electrolytic oxidation polymerization [JP-A-60-235,831 and J. Polymer Sci. Polymer Chem. Ed., 26, 1531 (1988)] can form a film of polyaniline on an electrode, but has such a problem that its isolation operation becomes complicated and its mass production is difficult.

Proposals have recently been made for an alkali-soluble sulfonated polyaniline which develops conductivity without adding a doping agent and its synthesis method and for a carboxylated polyaniline and its synthesis method.

As a method for the synthesis of a sulfonated polyaniline, there are known, for example, a method for the synthesis of a sulfonated polyaniline by electrochemically polymerizing aniline and m-aminobenzenesulfonic acid (Journal of The Chemical Society of Japan, 1985, 1124 and JA-A-2-166, 165), a method for the synthesis of a sulfonated polyaniline by electrochemically polymerizing an o-, m- or p-aminobenzenesulfonic acid alone [Lecture Preprint II in the 64th Autumn Annual Convention of The Chemical Society of Japan, 706 (1992)], a method for the synthesis of a sulfonated polyaniline by chemically polymerizing aniline and an o- or m-aminobenzenesulfonic acid (JP-A-1-301, 714), a method for the chemical oxidation polymerization of an aminobenzenesulfonic acid compound or monomers comprising an aminobenzenesulfonic acid compound and an aniline compound (JP-A-6-56,987), a method for the sulfonation with conc. sulfuric acid of an emeraldine type polymer (polyaniline) obtained by chemical or electro-chemical polymerization (JP-A-58-210,902), a method for the sulfonation with sulfuric anhydride/triethyl phosphate complex (JP-A-61-197,633), a method for the sulfonation with fuming sulfuric acid [J. Am. Chem. Soc., (1991) 113, 2665–2671, J. Am. Chem. Soc., (1990) 112, 2800 and WO91-06887], a method for the synthesis of a sulfonated polyaniline of the N-substitution type by chemically polymerizing diphenylamine-4-sulfonic acid (sodium salt) [Polymer, (1993) 34, 158–162] and the like.

In J. Am. Chem. Soc., (1991) 113, 2665–2671, it is reported that the chemical and electrochemical polymerization of o- or m-aminobenzenesulfonic acid was tried but was not successful.

Furthermore, JP-A-6-56,987 states that when an aminobenzenesulfonic acid compound is or an aminobenzenesulfonic acid compound and an aniline compound are subjected to chemical oxidative polymerization in all of the acidic, neutral and alkaline solutions, a soluble conductive polymer which is soluble in water is obtained, and shows polymerization examples in sulfuric acid-acidic solution. However, in said publication, there is no statement of the molecular weight and other physical properties of the polymer, and hence, it is not clear what physical properties the polymer has. According to the present inventors' duplication, no polymer having a sufficiently large molecular weight for forming a film was able to be obtained. Moreover, when the present inventors have tried polymerization in an aqueous solution containing a protonic acid using sodium peroxodisulfate as an oxidizing agent, a polymer soluble in water was obtained but the molecular weight of the polymer was low and no practicably usable polymer for forming a film was able to be obtained.

Furthermore, the present inventors have duplicated the method for chemically polymerizing aniline and m-aminobenzenesulfonic acid with ammonium peroxodisulfate stated in JP-A-1-301,714 and the method for chemically polymerizing aniline and m-aminobenzenesulfonic acid with potassium permanganate stated in JP-A-6-56,987, to find that the sulfonic acid group has been introduced only in a proportion of about one sulfonic acid group per 5 aromatic rings in the polymer, and the polymer exhibited high conductivity but was completely insoluble in neutral or acidic water and substantially insoluble in an alkaline aqueous solution such as ammonia water. Moreover, when the sulfonation has been effected according to the method of JP-A-61-197,633, the solubility of the polyaniline in the sulfonation solvent has not been sufficient and the sulfonation reaction has proceeded in the dispersion state of the polymer, so that the sulfonic acid group has been introduced only in a proportion of about 1 group per 5 aromatic rings as described on page 7 of the same publication. The thus obtained sulfonated polyaniline in which the proportion of the sulfonic acid group introduced is small has such a problem that the conductivity and solubility are not sufficient.

In addition, J. Am. Chem. Soc., 113, 2665–2671 (1991) and J. Am. Chem. Soc., 112, 2800 (1990) state that when polyaniline is sulfonated with fuming sulfuric acid, the sulfonic acid group is introduced in a proportion of about one sulfonic acid group per two aromatic rings. However, when the polyaniline has been tried to be sufficiently sulfonated according to the above-mentioned method, a large excess of fuming sulfuric acid has become necessary because the solubility of the polyaniline in fuming sulfuric acid has not been sufficient. Moreover, there is also such a problem that when the polyaniline is added to fuming sulfuric acid, the polymer is easy to solidify. In addition, there is such a problem that the polymer synthesized by the above-mentioned method and its sulfonated product are dissolved in an aqueous solution containing a base such as ammonia, an alkylamine or the like but not dissolved in water alone.

Also, Polymer, 34, 158–162 (1993) describes that when diphenylamine-4-sulfonic acid (sodium salt) is polymerized, an N-position-substituted type sulfonated polyaniline in which the benzenesulfonic acid group has been introduced in a proportion of one group per aniline skeleton is obtained, and this is dissolved in water alone, but ultracentrifugal operation is required for the isolation of the polymer. According to the present inventors' duplication, the yield of the polymer taken out of the polymerization solvent has been low because of the high solubility of the polymer in the solvent, and when no high speed centrifugal operation has been effected, it has been impossible to isolate the polymer. Furthermore, since the polymer is of an N-position-substituted type, it has been lower in conductivity than the polymer synthesized by the method of J. Am. Chem. Soc., 113, 2665–2671 (1991).

As a method for the synthesis of a carboxylated polyaniline, JP-A-4-268,331 proposes, for example, a production method in which 2- or 3-carboxyl group-substituted aniline or its salt is subjected to oxidative polymerization and then treated with a basic material to obtain a product in which the carboxyl group is in the form of a salt; however, the amount of the oxidizing agent used is required to be at least 2 equivalents per equivalent of the starting material and the electrical conductivity is low. From this fact, it is considered that the reactivity of monomer be low and a low molecular weight polymer have been produced.

JP-A-5-226,238 proposes a synthesis method in which methyl anthranilate (methyl ester of anthranilic acid) is polymerized in the presence of ammonium peroxodisulfate in an aqueous acidic medium and thereafter the methyl ester is saponified with alcoholic potassium hydroxide. However, since the reaction is effected two steps, the operation is very much complicated.

Further, the present inventors have tried to polymerize 2-carboxyl group-substituted aniline in an aqueous solution containing a protonic acid using ammonium peroxodisulfate as an oxidizing agent, but have not been able to obtain any product. They have also tried to polymerize aniline and a 2-carboxyl group-substituted aniline in an aqueous solution containing a protonic acid using ammonium peroxodisulfate as an oxidizing agent. However, a copolymer has been obtained, but the solubility and conductive thereof have been low. From this fact, it is considered that the copolymerization ratio of 2-carboxyl group-substituted aniline be low in the copolymer obtained.

When the moldability including film-formability by coating and the like are taken into consideration, particularly in order to make the polymer coatable on both hydrophilic and hydrophobic substrates, it is desired that the polymer is soluble in both water and organic solvent. However, the sulfonation product of polyaniline is soluble in alkaline aqueous solutions but insoluble in neutral to acidic aqueous solutions, and it cannot be said that the solubility in an organic solvent is sufficient.

As a method for solving these various problems, the present inventors have considered that in order to allow a polymer to exhibit conductivity without adding a doping agent and allow its solubility to be enhanced, it is necessary to introduce more acidic groups such as sulfonic acid groups or carboxyl groups into the main chain aromatic ring, and have proposed a process for producing a sulfonation product of an aniline copolymer by copolymerizing at least one compound selected from the group consisting of aniline, N-alkylanilines and phenylenediamines with aminobenzenesulfonic acid using an oxidizing agent in an acidic solvent and further sulfonating the resulting copolymer with a sulfonating agent (JP-A-5-178,989). However, the above process has had a problem of treatment of wasted acid because the sulfonation operation is effected in conc. sulfuric acid. Incidentally, the copolymers synthesized are all inferred to have the structures represented by the general formula (7):

(7)

wherein each of $R_{11}$ to $R_{14}$ is a group selected from the group consisting of hydrogen and sulfonic acid group; R' is a group selected from the group consisting of hydrogen and alkyl groups having 1 to 4 carbon atoms; the number of the sulfonic acid group is 40 to 80% of the number of the aromatic ring; x represents any number of 0 to 1 and n is a numeral of 2 to 1,500 showing the degree of polymerization.

In addition, the present inventors have proposed a process for producing an aniline copolymer, characterized by copolymerizing at least one compound selected from the group consisting of aniline, N-alkylanilines and phenylenediamines with an alkoxy group-substituted aminobenzenesulfonic acid. Thereby omitting the sulfonation operation which causes a large amount of waste (JP-A-6-293,828). Incidentally, the copolymers synthesized are all inferred to have the structures represented by the general formula (8):

(8)

wherein each of $R_{15}$ to $R_{22}$ is a group selected from the group consisting of hydrogen, alkoxy groups and sulfonic acid group; the number of the sulfonic acid group is 25 to 50% of the number of the aromatic ring; the alkoxy group and the sulfonic acid group are contained in one and the same aromatic ring; R' is a group selected from the group consisting of hydrogen and alkyl groups having 1 to 4 carbon atoms; x represents any number of 0 to 1 and n is a numeral of 2 to 1,500 which shows the degree of polymerization.

Furthermore, the present inventors have proposed a process for producing a soluble conductive polymer of the soluble aniline type by polymerizing an acidic group-substituted aniline such as a sulfonic acid group-substituted aniline, a carboxyl group-substituted aniline or the like in a solution containing a basic compound (JP-A-7-196,791 and JP-A-7-324,132). According to this process, contrary to the conventional established theory that it is difficult to polymerize alone anilines having sulfonic acid groups or carboxyl groups, it is possible to produce a high molecular weight polymer. In addition, the soluble conductive polymer obtained exhibits a high conductivity and also exhibits an excellent dissolvability in both acidic and alkaline aqueous solutions. However, when the soluble conductive polymer is separated from the by-product salt of the oxidizing agent used in the oxidative polymerization, the operation thereof has not been easy on a commercial scale because the dissolvability of the soluble conductive polymer per se is very excellent. Incidentally, the copolymers synthesized by the above-mentioned processes are inferred to have the structures represented by the general formula (9):

(Journal of The Chemical Society of Japan, 1985, 1124 and JP-A-02-166,165) and a process for electrochemically polymerizing aminobenzenesulfonic acid [Preprint II of the 64th Autumn Annual Convention of The Chemical Society of Japan, 706 (1992)]. However, in these processes, an inorganic salt is added as an electrolyte, and hence, there is such a problem that the operation for separating the soluble conductive polymer from the electrolyte after the polymerization is complicated and the application of the processes to the mass production on a commercial scale is very difficult.

SUMMARY OF THE INVENTION

The object of this invention is to provide a soluble conductive polymer having a high molecular weight and having a high conductivity and solubility and also provide an industrially useful method for producing the same.

The present inventors have eagerly made research on a method for producing an acidic group-substituted polyaniline in which the proportion of the acidic group introduced to the aromatic ring is large, such as a sulfonated polyaniline in which the proportion of the sulfonic acid group introduced to the aromatic ring is large, a carboxylated polyaniline in which the proportion of the carboxyl group introduced to the aromatic ring is large, or the like as a polyaniline having a high conductivity and solubility, and have consequently found that when an acidic group-substituted aniline such as a sulfonic acid group-substituted aniline, a carboxyl group-substituted aniline or the like is or this acidic group-substituted aniline and an aniline derivative are subjected as a monomer or monomers to electrolytic oxidation polymerization in a solution containing a basic compound, there is obtained a soluble conductive polymer (9)

wherein each of $A_1$ to $A_4$ is a group selected from the group consisting of sulfonic group, carboxyl group and their alkali metal salts, ammonium salts and substituted ammonium salts; each of $B_1$ to $B_4$ is a group selected from the group consisting of hydrogen, straight chain or branched chain alkyl groups having 1 to 4 carbon atoms; straight chain or branched chain alkoxy groups having 1 to 4 carbon atoms, acidic groups, hydroxyl group, nitro group and halogen groups; x represents any number of 0 to 1; and n represents a numeral of 2 to 5,000 which shows the degree of polymerization.

On the other hand, there have been reported a process for synthesizing a sulfonated polyaniline by electrochemically polymerizing aniline and m-aminobenzenesulfonic acid having a high conductivity, a high solubility and a high molecular weight which has not been obtained by chemical oxidation polymerization.

In addition, the above monomers and polymer act as electrolytes and hence the electrolytes that have been necessary in the conventional electrolytic oxidation polymerization become unnecessary and hence the operation for separating the electrolytes from the soluble conductive polymer can be omitted. Accordingly, the polymerization mixture per se can be used as a commercial article such as a coating agent or the like, and hence, the above production method is industrially advantageous.

Furthermore, since the polymer formed by the polymerization is soluble in the reaction mixture, the mass production of a polymer on a commercial scale by polymerization in a continuous electrolysis system such as a flow through system or the like is possible. The flow through system is a system in which polymerization is conducted by circulating the reaction mixture to the cell between the acting electrode and the negative electrode by means of a liquid-transporting pump, and it is made possible to carry out the polymerization reaction under the optimum conditions by connecting the cells in series or in parallel. Moreover, the present inventors have found that the knowledge of the electrolytic polymerization with regard to these acidic group-substituted anilines can also be applied in quite the same manner to acidic group-substituted pyrroles, thiophenes, furans, selenophenes, tellurophenes, isothianaphthenes, isobenzofurans, isoindolines, isobenzoselenophenes and isobenzotellurophenes. This invention has been achieved based on the above-mentioned knowledge.

That is to say, this invention relates to a method for producing a soluble conductive polymer having an acidic group which comprises subjecting to electrolytic polymerization (a) at least one compound selected from the group consisting of acidic group-substituted anilines, acidic group-substituted pyrroles, acidic group-substituted thiophenes, acidic group-substituted furans, acidic group-substituted selenophenes, acidic group-substituted tellurophenes, acidic group-substituted isothianaphthenes, acidic group-substituted isobenzofurans, acidic group-substituted isoindolines, acidic group-substituted isobenzoselenophenes, acidic group-substituted isobenzotellurophenes, and their metal salts, ammonium salts and substituted ammonium salts in a solution containing (b) a basic compound.

The other embodiment of this invention relates to a method for producing a soluble conductive polymer having an acidic group which comprises subjecting to electrolytic polymerization (a) at least one compound selected from the group consisting of acidic group-substituted anilines, acidic group-substituted pyrroles, acidic group-substituted thiophenes, acidic group-substituted furans, acidic group-substituted selenophenes, acidic group-substituted tellurophenes, acidic group-substituted isothianaphthenes, acidic group-substituted isobenzofurans, acidic group-substituted isoindolines, acidic group-substituted isobenzoselenophenes, acidic group-substituted isobenzotellurophenes, and their metal salts, ammonium salts and substituted ammonium salts and (c) at least one compound selected from the group consisting of aniline derivatives, pyrrole derivatives, thiophene derivatives, furan derivatives, selenophene derivatives, tellurophene derivatives, isothianaphthene derivatives, isobenzofuran derivatives, isoindoline derivatives, isobenzoselenophene derivatives and isobenzotellurophene derivatives in a solution containing (b) a basic compound.

DESCRIPTION OF THE PREFERRED EMBODIMENTS

An acidic group-substituted aniline polymer which is the most preferable example of this invention is used as an example below to explain this invention in more detail. However, this applies quite similarly to the cases of acidic group-substituted pyrroles, thiophenes, furans, selenophenes, tellurophenes, isothianaphthenes, isobenzofurans, isoindolines, isobenzoselenophenes and isobenzotellurophenes.

The above-mentioned acidic group-substituted aniline represents at least one compound selected from the group consisting of acidic group-substituted anilines represented by the general formula (1) and their metal salts, ammonium salts and substituted ammonium salts:

wherein $R_1$, $R_2$, $R_3$, $R_4$ and $R_5$ are substituents selected from the group consisting of hydrogen, straight chain or branched chain alkyl groups having 1 to 24 carbon atoms, straight chain or branched chain alkoxy groups having 1 to 24 carbon atoms, acidic groups, hydroxyl group, nitro group and halogen groups and at least one of $R_1$ to $R_5$ represents an acidic group, the above acidic group meaning a sulfonic acid group or a carboxyl group. When the acidic group is bonded to the compound of the above general formula (1) in the o- or m-position to the amino group, the polymer obtained is superior in performance such as conductivity, solubility and the like.

As the above acidic group-substituted anilines, most typical are sulfonic acid group-substituted anilines and carboxyl group-substituted anilines. The sulfonic acid group-substituted anilines are preferably used and the conductivity of the polymer obtained tends to be higher than when the carboxyl group-substituted anilines are used.

The most typical sulfonic acid group-substituted anilines are aminobenzenesulfonic acids, and specifically, there are preferably used o-, m- and p-aminobenzenesulfonic acids, aniline-2,6-disulfonic acid, aniline-2,5-disulfonic acid, aniline-3,5-disulfonic acid, aniline-2,4-disulfonic acid and aniline-3,4-disulfonic acid.

As other sulfonic acid group-substituted anilines, there can be mentioned alkyl group-substituted aminobenzenesulfonic acids such as methylaminobenzenesulfonic acid, ethylaminobenzenesulfonic acid, n-propylaminobenzenesulfonic acid, isopropylaminobenzenesulfonic acid, n-butylaminobenzenesulfonic acid, sec-butylaminobenzenesulfonic acid, t-butylaminobenzenesulfonic acid and the like; alkoxy group-substituted aminobenzenesulfonic acids such as methoxyaminobenzenesulfonic acid, ethoxyaminobenzenesulfonic acid, n-propoxyaminobenzenesulfonic acid, isopropoxyaminobenzenesulfonic acid, n-butoxyaminobenzenesulfonic acid, sec-butoxyaminobenzenesulfonic acid, t-butoxyaminobenzenesulfonic acid and the like: hydroxy group-substituted aminobenzenesulfonic acids; nitro group-substituted aminobenzenesulfonic acids; halogen group-substituted aminobenzenesulfonic acids such as fluoroaminobenzenesulfonic acid, chloroaminobenzenesulfonic acid, bromoaminobenzenesulfonic acid and the like; etc. Among them, alkyl group-substituted aminobenzenesulfonic acids, alkoxy group-substituted aminobenzenesulfonic acids and hydroxyl group-substituted aminobenzenesulfonic acids are most preferable in practical use. Incidentally, these sulfonic acid group-substituted anilines may be used alone or in admixture with any proportion of their isomers.

The most typical carboxyl group-substituted anilines are aminobenzenecarboxylic acids, and specifically, there are preferably used o-, m- and p-aminobenzenecarboxylic acids, aniline-2,6-dicarboxylic acid, aniline-2,5-dicarboxylic acid, aniline-3,5-dicarboxylic acid, aniline-2,4-dicarboxylic acid and aniline-3,4-dicarboxylic acid.

As other carboxyl group-substituted anilines, there can be mentioned alkyl group-substituted aminobenzenecarboxylic acids such as methylaminobenzenecarboxylic acid, ethylaminobenzenecarboxylic acid, n-propylaminobenzenecarboxylic acid, isopropylaminobenzenecarboxylic acid, n-butylaminobenzenecarboxylic acid, sec-butylaminobenzenecarboxylic acid, t-butylaminobenzenecarboxylic acid and the like; alkoxy group-substituted aminobenzenecarboxylic acids such as methoxyaminobenzenecarboxylic acid, ethoxyaminobenzenecarboxylic acid, n-propoxyaminobenzenecarboxylic acid, isopropoxyaminobenzenecarboxylic acid, n-butoxyaminobenzenecarboxylic acid, sec-butoxyaminobenzenecarboxylic acid, t-butoxyaminobenzenecarboxylic acid and the like; hydroxy group-substituted aminobenzenecarboxylic acids; nitro group-substituted aminobenzenecarboxylic acids, halogen group-substituted aminobenzenecarboxylic acids such as fluoroaminobenzenecarboxylic acid, chloroaminobenzenecarboxylic acid, bromoaminobenzenecarboxylic acid and the like; etc. Among them, alkyl group-substituted aminobenzenecarboxylic acids, alkoxy group-substituted aminobenzenecarboxylic acids and hydroxy group-substituted aminobenzenecarboxylic acids are most preferable in practical use. These carboxyl group-substituted anilines may be used alone or in admixture with any proportion of their isomers.

Specific examples of the acidic group-substituted anilines of the general formula (1) include sulfonic acid group-substituted alkylanilines, carboxyl group-substituted alkylanilines, sulfonic acid group-substituted alkoxyanilines, carboxyl group-substituted alkoxyanilines, sulfonic acid group-substituted hydroxyanilines, carboxyl group-substituted hydroxyanilines, sulfonic acid group-substituted nitroanilines, carboxyl group-substituted nitroanilines, sulfonic acid group-substituted fluoroanilines, carboxyl group-substituted fluoroanilines, sulfonic acid group-substituted chloroanilines, carboxyl group-substituted chloroanilines, sulfonic acid group-substituted bromoanilines, carboxyl group-substituted bromoanilines and the like. Specific examples of the positions of these substituents and the combinations of the substituents are shown in Table 1.

TABLE 1

| $R_1$ | $R_2$ | $R_3$ | $R_4$ | $R_5$ |
|---|---|---|---|---|
| A | B | H | H | H |
| A | H | B | H | H |
| A | H | H | B | H |
| A | H | H | H | B |
| H | A | B | H | H |
| H | A | H | B | H |
| H | A | H | H | B |
| B | A | H | H | H |
| H | H | A | B | H |
| H | H | A | H | B |
| B | H | A | H | H |
| H | B | A | H | H |
| H | H | H | A | B |
| H | H | B | A | H |
| H | B | H | A | H |

TABLE 1-continued

| $R_1$ | $R_2$ | $R_3$ | $R_4$ | $R_5$ |
|---|---|---|---|---|
| B | H | H | A | H |
| H | H | H | B | A |
| H | H | B | H | A |
| H | B | H | H | A |
| B | H | H | H | A |

In Table 1, A means at least one group selected from the group consisting of sulfonic acid group, carboxyl group and their alkali metal salts, ammonium salts and substituted ammonium salts; B means at least one group selected from the group consisting of alkyl groups such as methyl group, ethyl group, n-propyl group, isopropyl group, n-butyl group, sec-butyl group, t-butyl group and the like; alkoxy groups such as methoxy group, ethoxy group, n-propoxy group, isopropoxy group, n-butoxy group, sec-butoxy group, t-butoxy group and the like; hydroxyl group; nitro group; fluoro group; halogen groups such as fluoro group, chloro group, bromo group and the like; and H means hydrogen.

The metals which form salts of these monomers include lithium, sodium, potassium and the like.

The substituted ammoniums include acyclic ammoniums, cyclic saturated ammoniums, cyclic unsaturated ammoniums and the like.

The above acyclic ammoniums include compounds represented by the general formula (10):

(10)

wherein each of $R_{23}$ to $R_{26}$ is a group independently selected from the group consisting of hydrogen and alkyl groups having 1 to 4 carbon atoms. There can be mentioned, for example, methylammonium, dimethylammonium, trimethylammonium, ethylammonium, diethylammonium, triethylammonium, methylethylammonium, diethylmethylammonium, dimethylethylammonium, propylammonium, dipropylammonium, isopropylammonium, diisopropylammonium, butylammonium, dibutylammonium, methylpropylammonium, ethylpropylammonium, methylisopropylammonium, ethylisopropylammonium, methylbutylammonium, ethylbutylammonium, tetramethylammonium, tetramethylolammonium, tetraethylammonium, tetra-n-butylammonium, tetra-sec-butylammonium, tetra-t-butylammonium and the like. Among them, the case where one of $R_{23}$ to $R_{26}$ is hydrogen and the other three are alkyl groups having 1 to 4 carbon atoms is most preferable, and the case where two of $R_{23}$ to $R_{26}$ are hydrogens and the other two are alkyl groups having 1 to 4 carbon atoms are more preferable.

As the cyclic saturated ammoniums, there are mentioned piperidinium, pyrrolidinium, morpholinium, piperazinium and derivatives having these skeletons and the like.

As the cyclic unsaturated ammoniums, there are mentioned pyridinium, α-picolinium, β-picolinium, γ-picolinium, quinolinium, isoquinolinium, pyrrolinium and derivatives having these skeletons and the like.

The basic compound (b) used in this invention may be any compound as far as it is a compound forming salts with the above-mentioned acidic group-substituted anilines, and there are preferably used ammonia, acyclic amines, cyclic saturated amines, cyclic unsaturated amines, inorganic bases and the like. In particular, acyclic amines, cyclic saturated amines and cyclic unsaturated amines and the like are preferred.

The acyclic amines include compounds represented by the general formula (11):

(11)

wherein each of $R_{27}$ to $R_{29}$ is a group selected independently from the group consisting of alkyl groups having 1 to 4 carbon atoms; and hydroxide compounds represented by the general formula (12):

(12)

wherein each of $R_{30}$ to $R_{33}$ is a group selected independently from the group consisting of hydrogen and alkyl groups having 1 to 4 carbon atoms.

As the cyclic saturated amines, there are preferably used piperidine, pyrrolidine, morpholine, piperazine, derivatives having these skeletons, ammonium hydroxy compounds of them and the like.

As the cyclic unsaturated amines, there are preferably used pyridine, α-picoline, β-picoline, γ-picoline, quinoline, isoquinoline, pyrroline, derivatives having these skeletons, ammonium hydroxy compounds of them and the like.

As the inorganic base, hydroxides such as sodium hydroxide, potassium hydroxide, lithium hydroxide and the like are preferably used; however, the conductivity of the polymer obtained tends to be inferior as compared with the above-mentioned acyclic amines, cyclic saturated amines and cyclic unsaturated amines.

The concentration of these basic compounds (b) is selected in the range of at least 0.1 mole/liter, preferably 0.1 to 10.0 moles/liter and more preferably 0.2 to 8.0 moles/liter. When the concentration is less than 0.1 mole/liter, the yield of the polymer obtained is decreased and when the concentration is more than 10.0 moles/liter, the conductivity shows a tendency to reduce. The above basic compound (b) can be used in admixture of two or more in any proportion.

The aniline derivative (c) includes compounds represented by the general formula (4):

(4)

wherein $R_6$ to $R_{10}$ represent substituents selected from the group consisting of hydrogen, straight chain or branched chain alkyl groups having 1 to 24 carbon atoms, straight chain or branched chain alkoxy groups having 1 to 24 carbon atoms, hydroxyl group, nitro group and halogen groups.

As the above-mentioned aniline derivative (c), aniline is most typical, and in addition to the same, there can be mentioned alkylanilines such as methylaniline, ethylaniline, n-propylaniline, isopropylaniline, n-butylaniline, sec-butylaniline, t-butylaniline and the like; alkoxyanilines such as methoxyaniline, ethoxyaniline, n-propoxyaniline, isopropoxyaniline, n-butoxyaniline, sec-butoxyaniline, t-butoxyaniline and the like; hydroxyaniline; nitroaniline; halogenoanilines such as fluoroaniline, chloroaniline, bromoaniline and the like. The co-existence of the aniline derivative (c) exhibits an effective action to improve the conductivity, film-forming properties and the like of the conductive polymer obtained.

The weight ratio between the compound (a) including the above acidic group-substituted anilines and the like and the basic compound (b) is such that (a):(b)=1:100–100:1, preferably 10:90–90:10. Here, when the proportion of the basic compound is low, the reactivity is lowered and the conductivity is also lowered. On the contrary, when the proportion of the basic compound is high, the proportion of the acidic group of the polymer obtained forming a salt with the basic compound becomes high and the conductivity tends to be lowered.

The weight ratio between the compound (a) including the above-mentioned acidic group-substituted anilines and the like plus the aniline derivative (c) and the basic compound (b) is such that [(a)+(c)]:(b)=1:100–100:1, preferably 10:90–90:10. Here, when the proportion of the basic compound is low, the reactivity is lowered and the conductivity is also lowered. On the contrary, the proportion of the basic compound is high, the proportion of the acidic group of the polymer obtained forming a salt with the basic compound becomes high and the conductivity tends to be lowered.

The molar proportion between the compound (a) including the above-mentioned acidic group-substituted anilines and the like and the aniline derivative (c) is in such a range that (a):(c)=100:0–30:70, preferably 99.999:0.001–50:50, more preferably 99.999:0.001–70:30. Here, when the proportion of the aniline derivative is high (exceeding 70), the sulfonic acid group content in the polymer obtained is not sufficient and the solubility tends to be lowered.

The molar ratio between the acidic group (d) in the compound (a) including the above-mentioned acidic group-substituted anilines and the like and the basic compound (b) is such that (d):(b)=1:100–100:1, preferably 1:0.25–1:20, more preferably 1:0.5–1:15. Here, when the proportion of the basic compound is low, the reactivity is lowered and the conductivity is also lowered. On the contrary, when the proportion of the basic compound is high, the proportion of the acidic group of the polymer obtained forming a salt with the basic compound becomes high and the conductivity tends to be lowered.

The concentration of the compound (a) including the a acidic group-substituted anilines and the like and the concentration of the aniline derivatives (c) at the time of the electrolytic polymerization are at least 0.1% by weight, preferably 0.5 to 50% by weight and more preferably 1 to 30% by weight, based on the weight of the solvent.

The polymerization or copolymerization is conducted by electrolytic oxidation polymerization in a solution containing the above basic compound. As the solvent, there are preferably used water, methanol, ethanol, isopropanol, acetonitrile, methyl isobutyl ketone, methyl ethyl ketone, dimethylformamide, dimethylacetamide and the like.

As the electrode material in the electrolytic oxidation polymerization, there can be used metal plates and net electrodes of gold, silver, platinum, nickel, mercury, stainless steel, copper, zinc, tin, lead, iron, aluminum, titanium, ruthenium, iridium, oxides of them and the like; carbon electrodes such as glassy carbon and the like; glass electrodes to which a metal oxide such as ITO glass, tin-indium oxide, tin oxide or the like is imparted; and the like, and among them, silver, platinum, titanium, glassy carbon and ITO glass are preferable.

As the electrolysis method, there can be used any method of electrolysis at constant current, controlled potential electrolysis and electrolysis at constant voltage. The current density at the time of the electrolytic polymerization at constant current is in the range of from 5 to 200 $mA/cm^2$, preferably from 10 to 200 $mA/cm^2$, and more preferably from 15 to 150 $mA/cm^2$. As to the potential in the electrolytic polymerization at constant potential, it is advantageous to apply to the working electrode a potential of not more than $-0.5$ V, preferably $-1$ V to $-10$ V and more preferably $-1$ V to $-7$ V, in relation to the standard electrode.

If necessary, an electrolyte, for example, $LiBF_4$; a salt of $HBF_4$, $HClO_4$, $HCl$, $H_2SO_4$ or the like; or the like can be added. However, in this invention, the compound (a) including the acidic group-substituted anilines and the like per se or the polymer per se serves as an electrolyte, so that the polymerization can be conducted without these electrolytes.

The reaction temperature is preferably $-15°$ to $70°$ C., more preferably $-5°$ to $60°$ C. Here, when the reaction temperature is lower than $-15°$ C. or higher than $70°$ C., the conductivity tends to be lowered.

All or some of the hydrogens of sulfonic acid groups or carboxyl groups in the polymer produced by the method of this invention, may be any member selected independently from the group consisting of alkali metals, ammonium and substituted ammoniums. Accordingly, these selected members may be present as one species or even in admixture of some species in the polymer.

Specifically, when the polymerization is effected in the presence of sodium hydroxide, almost all the hydrogen atoms in the sulfonic acid groups or carboxyl groups in the isolated polymer are in the sodium salt form. Similarly, when the polymerization is effected in the presence of ammonia, almost all the hydrogen atoms in the sulfonic acid groups or carboxyl groups of the polymer are in the ammonium form, and when the polymerization is effected in the presence of trimethylamine, almost all the hydrogen atoms of the sulfonic acid groups or carboxyl groups of the polymer are in the triethylammonium form. When the polymerization is effected in the presence of quinoline, almost all the hydrogen atoms of the sulfonic acid groups or carboxyl groups of the polymer are in the quinolinium form. Moreover, when the basic compounds are used in admixture, the polymer is obtained in the same mixture form. Specifically, when the polymerization is effected in the presence of sodium hydroxide and ammonia, it follows that a part of the hydrogen atoms in the sulfonic acid groups or carboxyl groups in the isolated polymer have been replaced with sodium and the other part thereof with ammonium.

Moreover, when the polymer obtained is treated with a solution in which both sodium hydroxide and ammonia are present, similarly to the above case, a part of the hydrogen atoms of the sulfonic acid groups or carboxyl groups of the polymer have been replaced with sodium and the other part thereof with ammonia.

As described above, the polymer in which a part of the acidic groups are in the salt form can be converted to that having free acidic groups by treating the former polymer in an acidic solution and then isolating the same. As the acidic solution, there can be mentioned hydrochloric acid, sulfuric acid, p-toluenesulfonic acid, nitric acid and the like. However, it is difficult to render all the acidic groups completely free even when the acid-substitution has been sufficiently effected.

The weight average molecular weight of the soluble conductive polymer having sulfonic acid groups or carboxyl groups on the aromatic rings thus obtained is at least 3,000, preferably 3,000 to 1,000,000 and more preferably 5,000 to 500,000. Moreover, the proportion of acidic group introduced into the aromatic ring is at least 50%, preferably at least 70%, and more preferably at least 80%. Here, when the proportion of the acidic group introduced is less than 50%, the dissolvability of the polymer in water tends to be small, and it becomes difficult to apply the polymer in industry.

This conductive polymer can be dissolved, without being further subjected to sulfonation operation, in simple water; water containing a base such as ammonia, an alkylamine or the like or a basic salt such as ammonium acetate, ammonium oxalate or the like; water containing an acid such as hydrochloric acid, sulfuric acid or the like; a solvent such as methyl alcohol, ethyl alcohol, isopropyl alcohol or the like; or a mixture thereof.

Explaining in detail the dissolvability, the soluble conductive polymer having acidic groups in this invention has such properties that it is dissolved in a proportion of at least 1% by weight in an aqueous alkali solution such as 0.1 mole/liter ammonia water, dissolved in a proportion of at least 1% by weight in an acidic solution such as 0.1 mole/liter aqueous sulfuric acid or the like, also dissolved in a proportion of at least 1% by weight in a neutral aqueous solution such as water alone or the like, and, in addition, dissolved in a proportion of at least 1% by weight in an organic solvent such as a 0.1 mole/liter alcoholic ammonia solution or the like.

Incidentally, the polymers and copolymers synthesized according to the above-mentioned methods are all inferred to have the structures represented by the general formula (13):

(13)

wherein $R_{34}$ to $R_{49}$ represent groups selected from the group consisting of hydrogen, straight chain or branched chain alkyl groups having 1 to 24 carbon atoms, straight chain or branched chain alkoxy groups having 1 to 24 carbon atoms, acidic groups, hydroxyl group, nitro group and halogen groups; the number of the acidic groups introduced is at least 50% of the number of the aromatic ring wherein the acidic groups mean sulfonic acid groups or carboxyl groups; x represents any number of 0 to 1; and n represents a numeral of 2 to 1,500 which shows the degree of polymerization.

This invention is explained below in more detail by Examples and Comparative Examples; however, this invention should not be construed to be limited to the Examples.

Measurement Method

IR spectrum was measured using an equipment manufactured by Perkin Elmer (Model 1600).

In the measurement of molecular weight distribution and molecular weight, as two GPC columns for aqueous solution, TSK-GEL G-5000PWKL and TSK-GEL G-3000PWXL (both of Toso K. K.) were connected in series and used to effect GPC-measurement (polyethylene oxide-reduced). As the column, three kinds of columns for aqueous solution were connected in series and used. Also, as the eluting solution, a 0.2 mole/liter phosphorate buffer solution was used.

As to conductivity, a four-probe method was used for the measurement of conductivity and a two-probe method was used for the measurement of surface resistance.

EXAMPLE 1

In 150 ml of a pyridine solution having a concentration of 0.05 mole/liter was dissolved 4.06 g of 2-aminoanisole-4-sulfonic acid, and in this solution were immersed glassy carbon as a working electrode and platinum as a negative electrode, after which a constant voltage of 1.5 V was applied with stirring at room temperature and electrolytic polymerization was conducted for one hour. Just after the starting of the electrolytic polymerization, polymerization reaction was caused on the surface of the polymerization electrode, and after 5 minutes, the colorless, transparent reaction mixture was changed to brown. After completion of the polymerization reaction, the deposition of polymer on the polymerization electrode and the like were not observed and the polymerization mixture was uniform. Moreover, the elution of a metal component from the polymerization electrode and oligomer and the like were hardly detected.

The polymerization mixture obtained was coated on a glass substrate by a spin coating method and dried at 100° C., to obtain a film having a thickness of 0.1 μm, a flat surface and a surface resistance value of $2 \times 10^5$ Ω/□.

The result of measurement of molecular weight showed that the number average molecular weight (Mn) was 20,000, the weight average molecular weight (Mw) was 22,000, the Z average molecular weight (Mz) was 24,000, the degree of dispersion Mw/Mn was 1.1 and Mz/Mw was 1.1.

The polymerization mixture obtained was concentrated under reduced pressure to isolate a polymer and the solubility of the polymer was measured. The solubility was determined by adding the polymer little by little to 10 ml of water, 10 ml of a 0.1 mole/liter aqueous sulfuric acid or 10 ml of a 0.1 mole/liter aqueous ammonia water and filtering the mixture when the polymer became undissolved.

The solubilities of the soluble conductive polymer synthesized in the present Example were:

Water: 250 mg/ml
Sulfuric acid: 245 mg/ml
Ammonia water: 260 mg/ml.

Figure 1:
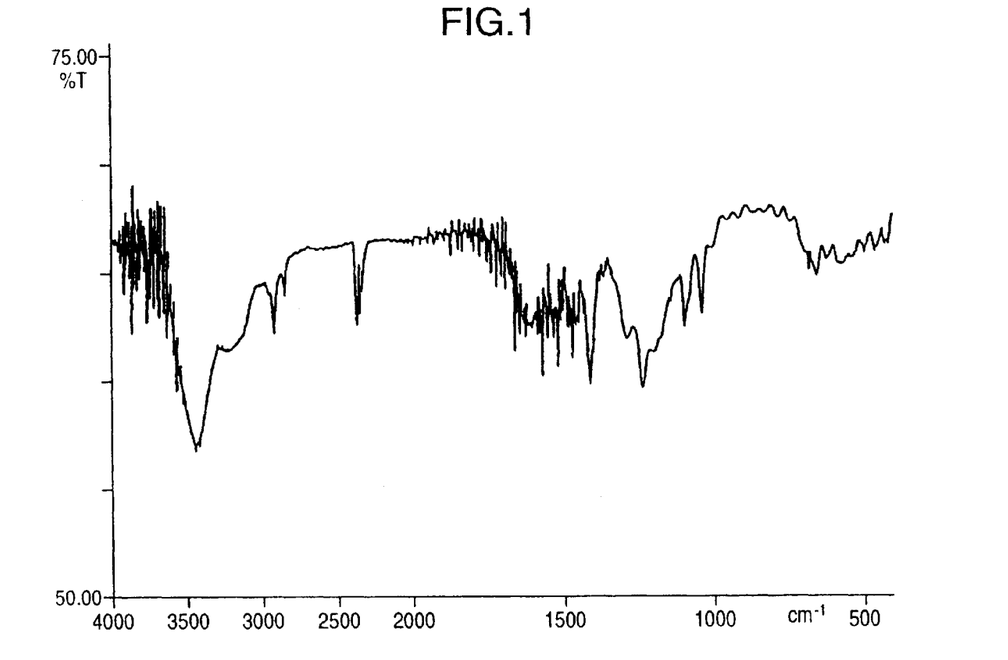
FIG. 1 is an IR spectrum of the polymer in Example 1.
Figure 2:
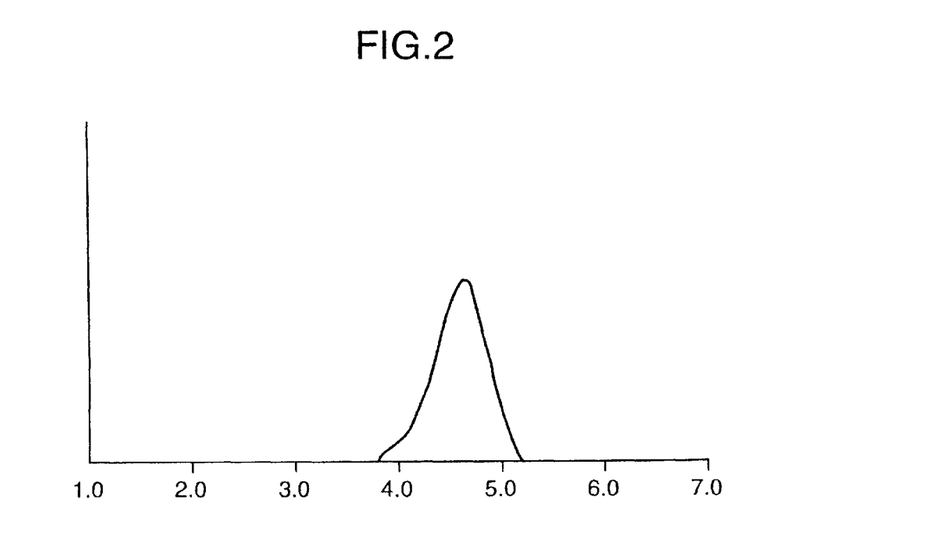
FIG. 2 is a GPC chart of the polymer in Example 1.

Moreover, the IR spectrum of the soluble conductive polymer mentioned above is shown in FIG. 1, and the GPC chart of the polymer is shown in FIG. 2.

The assignment of IR spectrum is as follows:

Sulfone group: Absorption in the vicinity of 1,120, 1,020 cm$^{-1}$

Skeleton of polymer: Absorption in the vicinity of 1,500 cm$^{-1}$

EXAMPLE 2

In 150 ml of an α-picoline solution having a concentration of 0.05 mole/liter was dissolved 3.7 g of 2-aminobenzenesulfonic acid, and in this solution were immersed glassy carbon as a working electrode and platinum as a negative electrode, after which a constant voltage of 2.0 V was applied with stirring at room temperature and electrolytic polymerization was conducted for 0.5 hour. After completion of the polymerization reaction, the deposition of polymer on the polymerization electrode and the like were not observed and the polymerization mixture was uniform. Also, the elution of a metal component from the polymerization electrode and oligomer and the like were hardly detected.

The polymerization mixture obtained was coated on a glass substrate by a spin coating method and dried at 80° C., to obtain a film having a thickness of 0.1 μm, a flat surface and a surface resistance value of $5 \times 10^6$ Ω/□.

EXAMPLE 3

In 150 ml of a triethylamine solution (water/isopropanol 1/1) having a concentration of 0.05 mole/liter were dissolved 3.6 g of 2-aminobenzenesulfonic acid and 0.1 g of aniline, and in this solution were immersed an ITO electrode as a working electrode and platinum as a negative electrode, after which a constant voltage of 2.0 V was applied with stirring at room temperature, and electrolytic polymerization was conducted for 0.5 hour. After completion of the polymerization reaction, the deposition of polymer on the polymerization electrode and the like were not observed and the polymerization mixture was uniform. Also, the elution of a metal component from the polymerization electrode and oligomer and the like were hardly detected.

The polymerization mixture obtained was coated on a glass substrate by a spin coating method and dried at 100° C., to obtain a film having a thickness of 0.1 μm, a flat surface and a surface resistance value of $1 \times 10^7$ Ω/□.

EXAMPLE 4

In 100 parts by weight of water were stirred 50 parts by weight of the polymer solution obtained in Example 1 and 100 parts by weight of an aqueous acrylic emulsion resin (NIKAZOL RX-301C, a trade name of NIPPON CARBIDE INDUSTRIES CO., INC.) at room temperature to prepare a conductive rough product. The solution thus obtained was coated on a PET film by a gravure coater of 40 μm in depth and dried at 120° C., to obtain a film having a thickness of 0.2 μm, a flat surface and a surface resistance value of $1 \times 10^7$ Ω/□.

EXAMPLE 5

100 parts by weight of the polymer solution obtained in Example 1 and 5 parts by weight of polyvinyl alcohol as a cross-linking agent were stirred and dissolved at room temperature to prepare a cross-linkable conductive composition. The solution thus obtained was coated on a PET film by a gravure coater of 40 μm in depth and dried at 150° C., to obtain a film having a thickness of 0.8 μm, a flat surface and a surface resistance value of $5 \times 10^6$ Ω/□. This conductive film was immersed in water and acetone; however, since the film had been cross-linked, dissolution, peeling and the like were not observed.

EXAMPLE 6

In 100 parts by weight of water were dissolved with stirring 100 parts by weight of the polymer solution obtained in Example 1, 5 parts by weight of polyvinyl alcohol as a cross-linking agent and 100 parts by weight of an aqueous acrylic emulsion resin (NIKAZOL RX-301C, a trade name of NIPPON CARBIDE INDUSTRIES CO., INC.) at room temperature to prepare a cross-linkable conductive composition. The solution thus obtained was coated on a zinc-plated steel plate (20 mm×50 mm×1 mm) by a dip coating method and dried at 150° C., to form a conductive layer having a thickness of 0.5 $\mu$m. This zinc-plated steel plate provided with a conductive layer (No. 1), a chromium compound-coated zinc-plated steel plate (the coating thickness: 5–6 $\mu$m) (No. 2) as a comparison and a zinc-plated steel plate (No. 3) as another comparison were sprayed with an aqueous sodium chloride solution at 40° C. (in accordance with the JIS-K-5400 method) and subjected to an anticorrosion test.

The results obtained are shown in Table 2.

TABLE 2

| Zinc-plated steel plate No. | Coated layer | Corrosion length |
|---|---|---|
| 1 | Conductive layer | 1 mm |
| 2 | Chromium compound | 5 mm |
| 3 | None | 6 mm |

EXAMPLE 7

In 30 ml of an aqueous ammonia solution having a concentration of 0.5 mole/liter was dissolved 3.0 g of 2-aminoanisole-4-sulfonic acid, and in this solution were immersed platinum as a working electrode and glassy carbon as negative electrode, after which a constant voltage of 2.5 V was applied at room temperature with stirring, and electrolytic polymerization was conducted for 12 hours. Just after the application of the constant voltage, polymerization reaction was caused on the working electrode, and the reaction mixture which was initially colorless and transparent was changed to blackish after 5 minutes. After completion of the polymerization reaction, the deposition of polymer on the working electrode, and the like were not observed and the polymerization mixture was uniformed. In addition, the elution of a metal component from the working electrode and oligomer and the like were hardly detected.

The polymerization mixture obtained was coated on a glass substrate by a spin coating method and dried at 100° C., to obtain a film having a thickness of 0.1 $\mu$m, a flat surface and a surface resistance value of $2\times10^5$ $\Omega/\square$.

EXAMPLE 8

In 30 ml of an aqueous ammonia solution having a concentration of 0.5 mole/liter was dissolved 3.0 g of 2-aminoanisole-4-sulfonic acid. In this solution were immersed platinum as a working electrode and glassy carbon as a negative electrode, and a constant voltage of 2.0 V was applied at room temperature while the solution was circulated to a series flow through cell by a pump, and electrolytic polymerization was conducted. Just after the application of the constant voltage, polymerization reaction was caused on the working electrode and the reaction mixture which was initially colorless and transparent was changed to blackish green after 5 minutes. After completion of the polymerization reaction, the deposition of polymer on the working electrode, and the like were not observed and the polymerization mixture was uniform. In addition, the elution of a metal component from the working electrode and oligomer and the like were hardly detected.

The polymerization mixture obtained was coated on a glass substrate by a spin coating method and dried at 80° C., to obtain a film having a thickness of 0.1 $\mu$m, a flat surface and a surface resistance value of $5\times10^6$ $\Omega/\square$.

EXAMPLE 9

In 20 ml of an aqueous diethylamine solution having a concentration of 0.5 mole/liter was dissolved 3.0 g of 2-aminoanisole-4-sulfonic acid, and in this solution were immersed platinum as a working electrode and glassy carbon as a negative electrode, after which a constant voltage of 2.5 V was applied without stirring at room temperature and electrolytic polymerization was conducted for 5 hours. Just after the application of the constant voltage, polymerization reaction was caused on the surface of the working electrode and, after 3 hours, a blackish green film-like polymer adhered to the working electrode. After completion of the polymerization reaction, the peeling, falling-off and the like of the polymer from the working electrode were not caused.

The polymerization mixture obtained was coated on a glass substrate by a spin coating method and dried at 100° C., to obtain a film having a thickness of 0.1 $\mu$m, a flat surface and a surface resistance value of $1\times10^7$

EXAMPLE 10

In 30 ml of an aqueous ammonia solution having a concentration of 0.5 mole/liter was dissolved 2.5 g of o-aminobenzoic acid, and in this solution were immersed platinum as a working electrode and glassy carbon as a negative electrode, after which a constant voltage of 3.0 V was applied without stirring at room temperature and electrolytic polymerization was conducted for 5 hours. Just after the application of the constant voltage, polymerization reaction was caused and, after 3 hours, a blackish green film-like polymer adhered to the working electrode. After completion of the polymerization reaction, the peeling, falling-off and the like of the polymer from the working electrode were not caused.

The polymerization mixture obtained was coated on a glass substrate by a spin coating method and dried at 100° C., to obtain a film having a thickness of 0.1 $\mu$m, a flat surface and a surface resistance value of $5\times10^7$ $\Omega/\square$.

EXAMPLE 11

In 30 ml of an aqueous ammonia water having a concentration of 0.5 mole/liter was dissolved 2.5 g of o-aminobenzoic acid and in this solution were immersed platinum as a working electrode and glassy carbon as a negative electrode, after which a constant voltage of 3.0 V was applied at room temperature while the solution was circulated to a series flow through cell by means of a pump, and electrolytic polymerization was conducted. Just after the application of the constant voltage, polymerization reaction was caused on the surface of the working electrode and, after 5 minutes, the reaction mixture which was initially colorless and transparent was changed to blackish green. After completion of the polymerization reaction, the deposition of polymer on the working electrode, and the like were not observed and the polymerization mixture was uniform. In addition, the elution of a metal component from the working electrode and oligomer and the like were hardly detected.

The polymerization mixture obtained was coated on a glass substrate by a spin coating method and dried at 100° C., to obtain a film having a thickness of 0.1 μm, a flat surface and a surface resistance value of $7 \times 10^6$ Ω/□.

EXAMPLE 12

In 30 ml of an aqueous ammonia water having a concentration of 0.5 mole/liter was dissolved 3.0 g of o-aminobenzenesulfonic acid and in this solution were immersed platinum as a working electrode and glassy carbon as a negative electrode, after which a constant voltage of 2.0 V was applied at room temperature while the solution was circulated to a series flow through cell by means of a pump, and electrolytic polymerization was conducted. Just after the application of the constant voltage, polymerization reaction was caused on the surface of the working electrode and, after 5 minutes, the reaction mixture which was initially colorless and transparent was changed to blackish green. After completion of the polymerization reaction, the deposition of polymer on the working electrode, and the like were not observed and the polymerization mixture was uniform. In addition, the elution of a metal component from the working electrode and oligomer and the like were hardly detected.

The polymerization mixture obtained was coated on a glass substrate by a spin coating method and dried at 80° C., to obtain a film having a thickness of 0.1 μm, a flat surface and a surface resistance value of $7 \times 10^6$ Ω/□.

EXAMPLE 13

In 20 ml of an aqueous pyridine solution having a concentration of 0.5 mole/liter was dissolved 1.0 g of thiophene-3-sulfonic acid, and in this solution were immersed platinum as a working electrode and glassy carbon as a negative electrode, after which a constant voltage of 2.0 V was applied without stirring at room temperature and electrolytic polymerization was conducted for 5 hours. Just after the application of the constant voltage, polymerization reaction was caused on the surface of the working electrode, and after 3 hours, a blackish green film-like polymer adhered to the working electrode. After completion of the polymerization reaction, the peeling, falling-off and the like of polymer were not caused.

The polymerization mixture obtained was coated on a glass substrate by a spin coating method and dried at 100° C., to obtain a film having a thickness of 0.1 μm, a flat surface and a surface resistance value of $1 \times 10^5$ Ω/□.

EXAMPLE 14

In 20 ml of an aqueous pyridine solution having a concentration of 0.5 mole/liter was dissolved 1.0 g of thiophene-3-sulfonic acid, and in this solution were immersed platinum as a working electrode and glassy carbon as a negative electrode, after which a constant voltage of 2.0 V was applied at room temperature while the solution was circulated to a series flow through cell by means of a pump and electrolytic polymerization was conducted. Just after the application of the constant voltage, polymerization reaction was caused on the surface of the working electrode, and the reaction mixture which was colorless and transparent was changed to blackish green after 5 minutes. After completion of the polymerization reaction, the deposition of polymer on the working electrode, and the like were not observed and the polymerization mixture was uniform. In addition, the elution of a metal component from the working electrode, and oligomer and the like were hardly detected.

The polymerization mixture obtained was coated on a glass substrate by a spin coating method and dried at 100° C., to obtain a film having a thickness of 0.1 μm, a flat surface and a surface resistance value of $7 \times 10^5$ Ω/□.

Comparative Example 1

2-Aminobenzenesulfonic acid was subjected to electrolytic polymerization according to the method described in Preprint II of the 64th Autumn Annual Convention of The Chemical Society of Japan, 706 (1992).

The resulting polymerization mixture was coated on a glass substrate by a spin coating method and dried at 80° C. However, since the polymerization mixture contained sulfuric acid, its coatability was bad and no film was obtained.

Comparative Example 2

A soluble conductive polymer of the soluble aniline type was synthesized by subjecting 2-aminobenzenesulfonic acid to chemical polymerization according to the method described in Example 1 of JP-A-7-324,132.

The resulting polymerization mixture was coated on a glass substrate by a spin coating method and dried at 80° C. The surface resistance value thereof was $1 \times 10^7$ Ω/□. However, in the polymerization mixture, a large amount of sulfuric acid was contained, so that no flat film was obtained.

In addition, separation was conducted according to the method stated; however, the filterability was bad and the operation was very complicated.

What is claimed is:

1. A method for producing a conductive polymer having acidic groups, which comprises subjecting to electrolytic polymerization (a) at least one compound selected from the group consisting of acidic group-substituted anilines, acidic group-substituted pyrroles, acidic group-substituted thiophenes, acidic group-substituted furans, acidic group-substituted selenophenes, acidic group-substituted tellurophenes, acidic group-substituted isothianaphthenes, acidic group-substituted isobenzofurans, acidic group-substituted isoindolines, acidic group-substituted isobenzoselenophenes, acidic group-substituted isobenzotellurophenes, and their metal salts, ammonium salts and substituted ammonium salts in a solution containing (b) a basic compound.

2. The method according to claim 1, wherein the electrolytic polymerization is continuously conducted using interconnected cells which are connected in series, in parallel or in combination of them.

3. The method according to claim 1 or 2, wherein the above acidic group-substituted anilines are those represented by the general formula (1):

(1)

wherein $R_1$, $R_2$, $R_3$, $R_4$ and $R_5$ are substituents selected from the group consisting of hydrogen, straight chain or branched chain alkyl groups having 1 to 24 carbon atoms, straight chain or branched chain alkoxy groups having 1 to 24 carbon atoms, acidic groups, hydroxyl group, nitro group and halogen groups, and at least one of $R_1$ to $R_5$ is an acidic group wherein the acidic group means a sulfonic acid group or a carboxyl group; and the above acidic group-substituted pyrroles, acidic group-substituted thiophenes, acidic group-substituted furans, acidic group-substituted selenophenes, acidic group-substituted tellurophenes, acidic group-substituted isothianaphthenes, acidic group-substituted isobenzofurans, acidic group-substituted isoindolines, acidic group-substituted isobenzoselenophenes and acidic group-substituted isobenzotellurophenes are respectively acidic group-substituted pyrroles, acidic group-substituted thiophenes, acidic group-substituted furans, acidic group-substituted selenophenes, acidic group-substituted tellurophenes, acidic group-substituted isothianaphthenes, acidic group-substituted isobenzofurans, acidic group-substituted isoindolines, acidic group-substituted isobenzoselenophenes and acidic group-substituted isobenzotellurophenes represented by the general formulas (2) and (3):

(2)

(3)

wherein Z is any one of NH, S, O, Se and Te; $R'_1$, $R'_2$, $R'_3$ and $R'_4$ are substituents selected from the group consisting of hydrogen, straight chain or branched chain alkyl groups having 1 to 24 carbon atoms, straight chain or branched chain alkoxy groups having 1 to 24 carbon atoms, acidic groups, hydroxyl group, nitro group and halogen groups; and at least one of $R'_1$ to $R'_4$ is an acidic group, wherein the acidic group means a sulfonic acid group or carboxyl group.

4. A method for producing a conductive polymer having acidic groups, which comprises subjecting to electrolytic polymerization (a) at least one compound selected from the group consisting of acidic group-substituted anilines, acidic group-substituted pyrroles, acidic group-substituted thiophenes, acidic group-substituted furans, acidic group-substituted selenophenes, acidic group-substituted tellurophenes, acidic group-substituted isothianaphthenes, acidic group-substituted isobenzofurans, acidic group-substituted isoindolines, acidic group-substituted isobenzoselenophenes and acidic group-substituted isobenzotellurophenes and their metal salts, ammonium salts and substituted ammonium salts and (c) at least one compound selected from the group consisting of aniline derivatives, pyrrole derivatives, thiophene derivatives, furan derivatives, selenophene derivatives, tellurophene derivatives, isothianaphthene derivatives, isobenzofuran derivatives, isoindoline derivatives, isobenzoselenophene derivatives and isobenzotellurophene derivatives in a solution containing (b) basic compound, wherein said aniline derivatives are aniline derivatives represented by the general formula (4):

(4)

wherein $R_6$, $R_7$, $R_8$, $R_9$, and $R_{10}$ are substituents selected from the group consisting of hydrogen, straight chain or branched chain alkyl groups having 1 to 24 carbon atoms, straight chain or branched chain alkoxy groups having 1 to 24 carbon atoms, hydroxyl group, nitro group and halogen groups; and the above pyrrole derivatives, thiophene derivatives, furan derivatives, selenophene derivatives, tellurophene derivatives, isothianaphthene derivatives, isobenzofuran derivatives, isoindoline derivatives, isobenzoselenophene derivatives and isobenzotellurophene derivatives are respectively pyrrole derivatives, thiophene derivatives, furan derivatives, selenophene derivatives, tellurophene derivatives, isothianaphthene derivatives, isobenzofuran derivatives, isoindoline derivatives, isobenzoselenophene derivatives and isobenzotellurophene derivatives represented by the general formulas (5) and (6):

(5)

(6)

wherein Z is any one of HN, S, O, Se and Te and $R'_6$, $R'_7$, $R'_8$ and $R'_9$ are substituents selected from the group consisting of hydrogen, straight chain or branched chain alkyl groups having 1 to 24 carbon atoms, straight chain or branched chain alkoxy groups having 1 to 24 carbon atoms, hydroxyl group, nitro group and halogen groups.

5. The method according to claim 4, wherein the electrolytic polymerization is continuously effected using interconnected cells connected in series, in parallel or in combination thereof.

6. The method according to claim 4 or 5, wherein the molar proportion between the above compound (a) and the above compound (c) is in such a range that (a):(c)=100:0 to 30:70.

* * * * *